United States Patent Office 2,788,258
Patented Apr. 9, 1957

2,788,258

REDUCED METAL PHOSPHOMOLYBDATES AND THEIR PREPARATION

Herrick R. Arnold, Wilmington, Del., and Benjamin W. Howk, West Chester, Pa., assignors to E. I. du Pont de Nemours and Company, Wilmington, Del., a corporation of Delaware No Drawing. Application July 16, 1953, Serial No. 368,489

17 Claims. (Cl. 23—51)

This invention relates to new compositions of matter and to their preparation. More particularly, this invention relates to new reduced phosphomolybdic acid metal salts and to methods for preparing them.

It is an object of this invention to provide new chemical compositions which are reduced metal phosphomolybdates and methods for preparing them. Other objects will appear hereinafter.

These and other objects of this invention are accomplished by providing reduced metal phosphomolybdates which are the products obtained by reducing in hydrogen at a temperature in excess of 375° C. a phosphomolybdic acid salt of a metal of groups I-A, I-B, II-B, III-B, VII-A, and the base metals of group VIII of the periodic table (see Sidgwick's "Chemical Elements and Their Compounds").

The preferred new reduced salts of phosphomolybdic acid by analysis correspond to compositions of the general formula $M_yP_2Mo_{20-26}O_{37-65}$, in which M is a metal from groups I-A, I-B, II-B, III-B, and VII-A, and base metals of group VIII of the periodic table, $y$ is an integer from 1 through 10, and the molybdenum is in a reduced oxidation state, i. e., of not greater than 5. These reduced products contain less than 1% hydrogen. Molybdenum forms compounds having the positive oxidation states 2, 3, 4, 5 and 6. (Reference Book of Inorganic Chemistry, Latimer and Hildebrand, The Macmillan Co., New York, 1940, page 357.)

Typical reduced metal phosphomolybdates are those where M is nickel, cobalt, iron, manganese, zinc, aluminum, copper, silver and potassium.

The preferred phosphomolybdic acid metal salts used as starting materials in preparing the products of this invention are generically hydrates of compounds comprehended by the formula $M_yP_2Mo_{20-24}O_{68-82}$, wherein $y$ is an integer from 1 through 10, preferably 2 through 10, and M is a metal from groups I-A, I-B, II-B, III-B, VII-A, and the base metals of group VIII of the periodic table, and the molybdenum is in its maximum oxidation state of 6.

Usually the products of this invention are made by placing the phosphomolybdic acid metal salt in a heat-resistant glass tube mounted within an electric furnace, passing hydrogen alone, or hydrogen admixed with a neutral diluent gas, such as nitrogen, over the charge at a rate corresponding to a space velocity of 500 to 1100 reciprocal hours, while raising the temperature from room temperature up to above 375° C. at the rate of 50° to 85° C. per hour. The reduction is continued in excess of 375° C. ordinarily for at least 6 hours and preferably for 16 to 25 hours. Thereafter the charge is permitted to cool to room temperature in hydrogen, flushed at room temperature with nitrogen, and stored under nitrogen, helium, or any other inert gas.

The examples which follow are submitted to illustrate and not to limit this invention.

Example I

A nickel salt of phospho-11-molybdic acid having the composition $Ni_2H_8[P_2(Mo_2O_7)_{11}] \cdot 24H_2O$ or $$2NiO \cdot P_2O_5 \cdot 22MoO_3 \cdot 28H_2O$$

was prepared by dissolving 100 g. of phospho-11-molybdic acid, and 43.6 g. of nickel nitrate hexahydrate in one liter of water and concentrating the solution on a steam bath until incipient crystallization of the nickel salt occurred. The solution was then slowly cooled to room temperature whereupon the nickel salt was crystallized. The crystals were isolated by filtration and dried in vacuo over $P_2O_5$.

Reduction of the nickel phospho-11-molybdate is carried out as follows:

Sixty-five grams (50 cc.) of the yellow crystalline nickel phospho-11-molybdate is placed in a heat-resistant glass tube mounted in an electric furnace, and hydrogen at the rate of 50 liters/hr., equivalent to a space velocity of 1000 reciprocal hours, is passed through the tube at essentially atmospheric pressure. The system is then heated up from room temperature to 400° C. at the rate of about 85–90° C. per hour and held under these conditions for 16.75 hours. During the heating up period, in the temperature range 100–200° C., the water of crystallization is driven off, the nickel phosphomolybdate undergoing a simultaneous color change from yellow to orange. In the interval 200–300° C. no further water is formed and no significant change in appearance of the nickel phosphomolybdate occurs. At approximately 300° C. reduction is initiated, as indicated by the evolution of water, and a gradual change in the color of the nickel salt from orange to black occurs. At 400° C. reduction proceeds more rapidly, however, and is continued at this temperature for a period of 16.75 hours. The reduced product is then cooled to room temperature in hydrogen, flushed at room temperature with nitrogen and discharged and sealed under nitrogen. The reduced product corresponds by analysis to the composition $$[Ni_2 \cdot P_2O_5 \cdot (Mo_2O_5)_{11}]$$

and is a black, amorphous, pyrophoric, solid having a surface area of 20 m.²/g. as determined by the procedure described in a paper by P. H. Emmett, entitled "A New Method for Measuring the Surface Area of Finely Divided Materials and for Determining the Size of Particles," Am. Soc. for Testing Materials, March 4, 1951, Symposium on New Methods for Particle Size Determination in the Sub-Sieve Range.

This catalyst and similar preparations of reduced nickel phosphomolybdate are employed in the processes described hereinafter in Examples A and B.

Example II

The process described in Example I applies also to the preparation of the iron, cobalt, manganese, zinc, aluminum, copper, silver, and potassium salts of phospho-11-molybdic acid and to the reduction of these salts. The composition of the unreduced salts is given in the left column of the table below and of the reduced material in the right column.

| Metal Phosphomolybdates | Reduced Metal Phosphomolybdates |
|---|---|
| $3CoO \cdot P_2O_5 \cdot 22MoO_3 \cdot 33H_2O$ | $Co_3 \cdot P_2O_5 \cdot (Mo_2O_5)_{11}$ |
| $3FeO \cdot P_2O_5 \cdot 22MoO_3 \cdot 56H_2O$ | $Fe_3 \cdot P_2O_5 \cdot (Mo_2O_5)_{10}$ |
| $3MnO \cdot P_2O_5 \cdot 22MoO_3 \cdot 29H_2O$ | $Mn_3 \cdot P_2O_5 \cdot (Mo_2O_5)_{12}$ |
| $3ZnO \cdot P_2O_5 \cdot 22MoO_3 \cdot 32H_2O$ | $Zn_3 \cdot P_2O_5 \cdot (Mo_2O_5)_{12}$ |
| $Al_2O_3 \cdot P_2O_5 \cdot 20MoO_3 \cdot 44H_2O$ | $Al_2 \cdot P_2O_5 \cdot (Mo_2O_5)_{11}$ |
| $3CuO \cdot P_2O_5 \cdot 22MoO_3 \cdot 43H_2O$ | $Cu_3 \cdot P_2O_5 \cdot (Mo_2O_4)_{12}$ |
| $5Ag_2O \cdot P_2O_5 \cdot 22MoO_3 \cdot 36H_2O$ | $Ag_{10} \cdot P_2O_5 \cdot (Mo_2O_4)_{13}$ |
| $2K_2O \cdot P_2O_5 \cdot 24MoO_3 \cdot XH_2O$ | $K_4 \cdot P_2O_5 \cdot (Mo_2O_5)_{12}$ |

These formulas for the unreduced metal phosphomolybdates show that the molybdenum is in its maximum oxidation state of 6, whereas the formulas for the reduced metal phosphomolybdates show that the molybdenum is in a reduced oxidation state of not greater than 5.

The products obtained by reduction of the phosphomolybdate metal salts are gray to black pyrophoric solids having surface areas in the range of 10 to 130 m.²/g., as determined by the method referred to in Example I. Their X-ray diffraction patterns indicated that they are principally amorphous, like reduced nickel phospho-11-molybdate.

The method for preparing the metal salts of phosphomolybdic acids need not be limited to that described in Example I. A modification of this method is to precipitate the metal salts from concentrated, syrupy solutions of a soluble metal salt and phosphomolybdic acid by addition of anhydrous alcohol. An alternative procedure is to boil an aqueous suspension of a metal phosphate (or a metal hydroxide or carbonate and phosphoric acid), with molybdenum trioxide and molybdic acid in suitable stoichiometric proportions to give the metal salt of the desired phosphomolybdic acid, filtering the digested slurry and concentrating the resulting filtrate to a syrupy consistency, then adding alcohol and crystallizing the metal salt in a dessicator over $P_2O_5$.

The metal salts need not be limited to the salts of phospho-11-molybdic and phospho-12-molybdic acids but may include those of phosphomolybdic acids containing phosphorus-molybdenum ratios varying from 1:12 to 1:2.5. Thus, for example, a nickel salt of phosphohemipentamolybdic acid, $$[Ni_2H_4 \cdot P_2O_4 \cdot (MoO_4)_5] \cdot 17H_2O$$

was prepared by dissolving 2 moles of $NiHPO_4$ and 5 moles of $H_2MoO_4$ in boiling water and precipitating the salt from the concentrated solution with alcohol. Reduction of this salt with hydrogen under the conditions described in Example I yielded black, non-pyrophoric products having the approximate composition $$Ni_2 \cdot P_2O_5 \cdot (MoO_3)_5$$

which were catalytically active for hydrogenation and carbonylation reactions.

The reduction of the metal phosphomolybdate is effected at atmospheric pressure with hydrogen alone, or with hydrogen admixed with a diluent gas such as nitrogen or carbon monoxide, at a temperature which is in excess of 375° C. but below 500° C. As a rule, however, the reduction is effected at 400°–475° C.

The time of reduction depends upon the composition of the reducing gas and the temperature used. As a rule it is at least 6 hours but below 30 hours. Under the preferred operating temperature conditions of 400°–475° C., and with hydrogen alone as the reducing gas, the time of reduction will be between 16 and 25 hours. The composition of the reduced phosphomolybdic acid metal salt will vary depending upon the temperature and time of reduction used. Within the preferred operating temperature range of 400°–475° C. and a 16–25 hour reduction time, the reduced phosphomolybdic acid metal salts will correspond to $M_yP_2Mo_{20-26}O_{37-65}$, where M and y have the previously indicated meanings. If temperatures above 500° C. are used phosphorus seems to be lost and the reduced product no longer corresponds to the indicated formula. When the preferred starting materials of the hereinbefore stated formula are employed wherein y is an integer from 2 to 10, the reduced metal phosphomolybdates will correspond to the above specified formula wherein y is likewise an integer of 2 to 10.

The reduced phosphomolybdic acid metal salts are those of the metals of groups I-A, I-B, II-B, III-B, VII-A and the base metals of group VIII, which includes lithium, sodium, potassium, rubidium, cesium, copper, silver, gold, zinc, cadmium, mercury, manganese, aluminum, iron, nickel and cobalt.

In the reduction, the hydrogen alone or the hydrogen and diluent gas, e. g., nitrogen or carbon monoxide, is permitted to pass at atmospheric pressure over the heated phosphomolybdic acid metal salt for a period of time sufficient to effect the reduction as indicated by the amount of water condensed from the effluent reducing gas stream. Usually a space velocity between 500 and 1100 reciprocal hours is sufficient under the preferred temperature conditions.

The reduced products of this invention are useful catalysts for hydrogenation, hydroformylation, alkylation, hydration, dehydration, and isomerization reactions. The following examples are illustrative of the uses of the novel reduced products of this invention.

*Example A*

Methyl cyclohexane was vaporized at a constant rate of 0.32 mole/hr. and fed into a stationary-bed reactor containing 25 ml. (37.0 g.) of 8–14 mesh reduced nickel phosphomolybdate prepared as described in Example I. Nitrogen, used as a carrier gas, was passed into the reactor at the same time and at a constant rate of 1 mole/hr. The reaction was carried out at atmospheric pressure at a catalyst bed temperature of 400±38° C. The effluent gases from the reactor were cooled to condense toluene and unreacted methyl cyclohexane from the nitrogen stream. Analysis of the condensate by means of an ultraviolet spectrometer indicated 7 volume percent of toluene in the methyl cyclohexane.

*Example B*

A 400 ml. steel pressure reactor which had been flushed with a stream of nitrogen, was charged with 5.0 g. of reduced nickel phosphomolybdate prepared as described in Example I, 78 g. (1 mole) of benzene, and 84 g. (2 moles) of propylene. The reactor was then shaken and heated to 200° C. for 5 hours under autogenous pressure. The liquid product weighed 145 g., after filtering the reaction mixture to remove the catalyst. The filtrate consisted of a mixture of isomeric propyl and dipropyl benzenes, propylene polymers, and a minor amount of unreacted benzene.

As many apparently widely different embodiments of this invention may be made without departing from the spirit and scope thereof, it is to be understood that this invention is not limited to the specific embodiments thereof except as defined in the appended claims.

We claim:

1. Process for preparation of a reduced metal phosphomolybdate which comprises reacting, at atmospheric pressure and at a temperature within the range of 375° to 500° C. for at least 6 hours, as sole reactants hydrogen and a phosphomolybdic acid salt of a metal selected from the class consisting of lithium, sodium, potassium, rubidium, cesium, copper, silver, gold, zinc, cadmium, mercury, manganese, aluminum, iron, nickel and cobalt.

2. Process for preparation of a reduced metal phosphomolybdate which comprises reacting, at atmospheric pressure and at a temperature within the range of 400° to 475° C., for at least 6 hours, as sole reactants hydrogen and a hydrate of a metal phosphomolybdate corresponding in composition to the formula $$M_yP_2Mo_{20-24}O_{68-82}$$

wherein y is an integer within the range of 2 to 10 and M is a base metal of group VIII of the periodic table.

3. Process for preparation of a reduced metal phosphomolybdate which comprises reacting, at atmospheric pressure and at a temperature within the range of 400° to 475° C. for at least 6 hours, as sole reactants hydrogen and a hydrate of a metal phosphomolybdate corresponding in composition to the formula $M_yP_2Mo_{20-24}O_{68-82}$ wherein $y$ is an integer within the range of 2 to 10 and M is a metal of group I of the periodic table.

4. Process for preparation of a reduced nickel phosphomolybdate which comprises reacting, at atmospheric pressure and at a temperature within the range of 400° to 475° C. for at least 6 hours, as sole reactants hydrogen and nickel phospho-11-molybdate.

5. Process for preparation of a reduced nickel phosphomolybdate which comprises reacting, at atmospheric pressure and at a temperature within the range of 375° to 500° C. for at least 6 hours, as sole reactants hydrogen and a nickel phosphomolybdate corresponding in composition to the formula $2NiO \cdot P_2O_5 \cdot 22MoO_3$ and obtaining as the resulting product a reduced nickel phosphomolybdate corresponding in composition to the formula $Ni_2 \cdot P_2O_5 \cdot (Mo_2O_5)_{11}$.

6. Process for preparation of a reduced cobalt phosphomolybdate which comprises reacting, at atmospheric pressure and at a temperature within the range of 375° to 500° C. for at least 6 hours, as sole reactants hydrogen and a cobalt phosphomolybdate corresponding in composition to the formula $3CoO \cdot P_2O_5 \cdot 22MoO_3$ and obtaining as the resulting product a reduced cobalt phosphomolybdate corresponding in composition to the formula $Co_3 \cdot P_2O_5 \cdot (Mo_2O_5)_{11}$.

7. Process for preparation of a reduced iron phosphomolybdate which comprises reacting, at atmospheric pressure and at a temperature within the range of 375° to 500° C. for at least 6 hours, as sole reactants hydrogen and an iron phosphomolybdate corresponding in composition to the formula $3FeO \cdot P_2O_5 \cdot 22MoO_3$ and obtaining as the resulting product a reduced iron phosphomolybdate corresponding in composition to the formula $Fe_3 \cdot P_2O_5 \cdot (Mo_2O_5)_{10}$.

8. Process for preparation of a reduced copper phosphomolybdate which comprises reacting, at atmospheric pressure and at a temperature within the range of 375° to 500° C. for at least 6 hours, as sole reactants hydrogen and a copper phosphomolybdate corresponding in composition to the formula $3CuO \cdot P_2O_5 \cdot 22MoO_3$ and obtaining as the resulting product a reduced copper phosphomolybdate corresponding in composition to the formula $Cu_3 \cdot P_2O_5 \cdot (Mo_2O_4)_{12}$.

9. Process for preparation of a reduced zinc phosphomolybdate which comprises reacting at atmospheric pressure and at a temperature within the range of 375° to 500° C. for at least 6 hours, as sole reactants hydrogen and a zinc phosphomolybdate corresponding in composition to the formula $3ZnO \cdot P_2O_5 \cdot 22MoO_3$ and obtaining as the resulting product a reduced zinc phosphomolybdate corresponding in composition to the formula $Zn_3 \cdot P_2O_5 \cdot (Mo_2O_3)_{12}$.

10. A reduced metal phosphomolybdate characterized by being a pyrophoric, principally amorphous solid corresponding in composition to the formula $$M_yP_2Mo_{20-26}O_{37-65}$$

wherein $y$ is an integer within the range of 2 to 10, M is a metal selected from the class consisting of lithium, sodium, potassium, rubidium, cesium, copper, silver, gold, zinc, cadmium, mercury, manganese, aluminum, iron, nickel and cobalt, and the molybdenum is in a reduced oxidation state of not greater than 5.

11. A reduced metal phosphomolybdate characterized by being a pyrophoric, principally amorphous solid corresponding in composition to the formula $$M_yP_2Mo_{20-26}O_{41-65}$$

wherein $y$ is an integer within the range of 2 to 10, M is a base metal of group VIII of the periodic table, and the molybdenum is in a reduced oxidation state of not greater than 5.

12. A reduced metal phosphomolybdate characterized by being a pyrophoric, principally amorphous solid corresponding in composition to the formula $$M_yP_2Mo_{20-26}O_{41-65}$$

wherein $y$ is an integer within the range of 2 to 10, M is a metal of group I of the periodic table, and the molybdenum is in a reduced oxidation state of not greater than 5.

13. A reduced nickel phosphomolybdate characterized by being a pyrophoric, principally amorphous solid corresponding in composition to the formula $$Ni_2 \cdot P_2O_5 \cdot (Mo_2O_5)_{11}$$

wherein the molybdenum is in a reduced oxidation state of not greater than 5.

14. A reduced cobalt phosphomolybdate characterized by being a pyrophoric, principally amorphous solid and corresponding in composition to the formula $$Co_3 \cdot P_2O_5 \cdot (Mo_2O_5)_{11}$$

wherein the molybdenum is in a reduced oxidation state of not greater than 5.

15. A reduced iron phosphomolybdate characterized by being a pyrophoric, principally amorphous solid corresponding in composition to the formula $$Fe_3 \cdot P_2O_5 \cdot (Mo_2O_5)_{10}$$

wherein the molybdenum is in a reduced oxidation state of not greater than 5.

16. A reduced copper phosphomolybdate characterized by being a pyrophoric, principally amorphous solid corresponding in composition to the formula $$Cu_3 \cdot P_2O_5 \cdot (Mo_2O_4)_{12}$$

wherein the molybdenum is in a reduced oxidation state of not greater than 5.

17. A reduced zinc phosphomolybdate characterized by being a pyrophoric, principally amorphous solid corresponding in composition to the formula $$Zn_3 \cdot P_2O_5 \cdot (Mo_2O_3)_{12}$$

wherein the molybdenum is in a reduced oxidation state of not greater than 5.

References Cited in the file of this patent

UNITED STATES PATENTS

| | | |
|---|---|---|
| 1,975,476 | Pier | Oct. 2, 1934 |
| 2,058,789 | Herold et al. | Oct. 27, 1936 |
| 2,453,327 | Layng | Nov. 9, 1948 |
| 2,547,380 | Fleck | Apr. 3, 1951 |

OTHER REFERENCES

Hoffman, M. K., "Lexikon der Anorganischen Verbinsungen," Band II, Nos. 56–81, pages 639, 642 and 658 (1912–1914).